UNITED STATES PATENT OFFICE 2,449,586

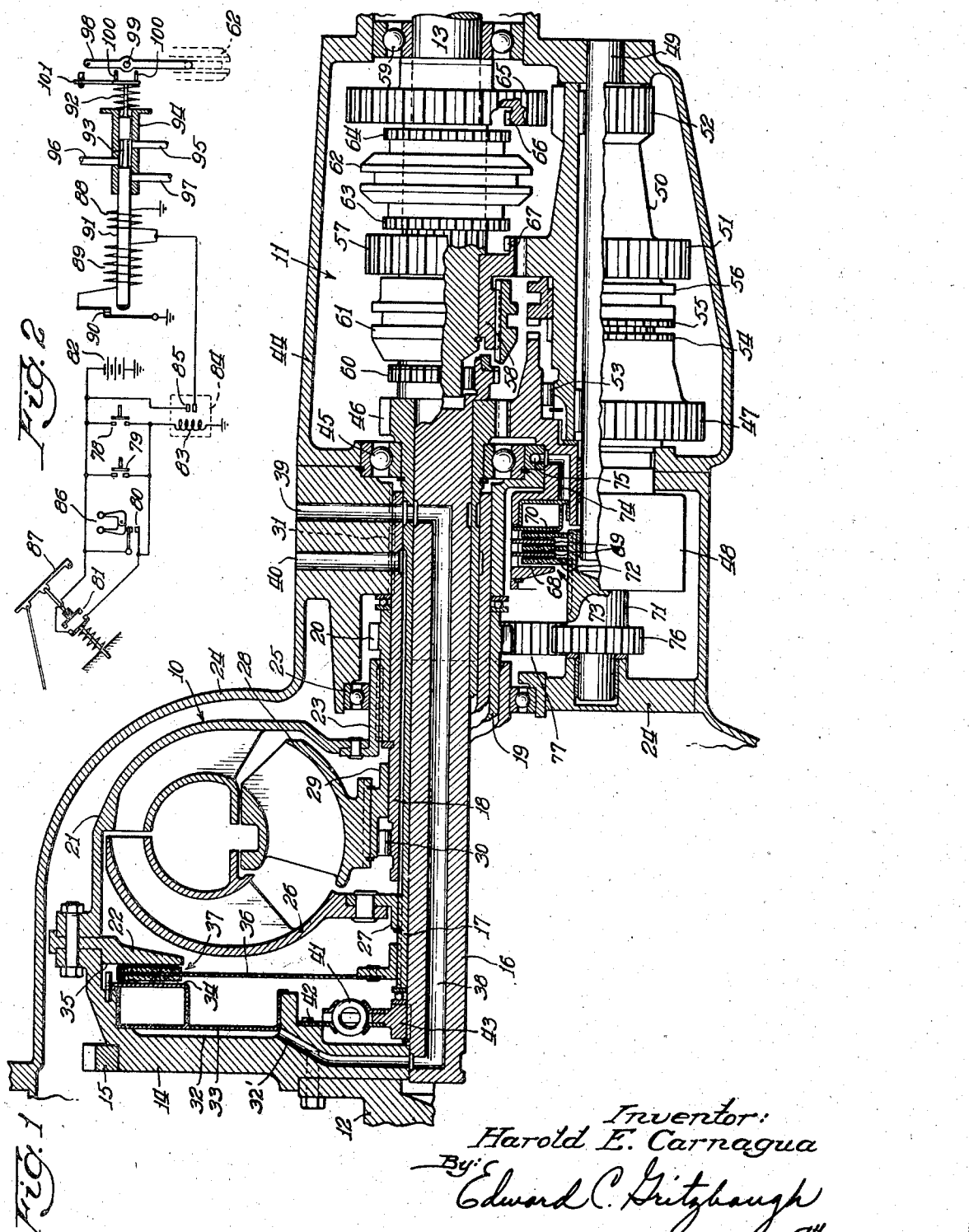

TRANSMISSION AND CONTROL THEREFOR

Harold E. Carnagua, Muncie, Ind., assignor to Borg-Warner Corporation, Chicago, Ill., a corporation of Illinois Application August 15, 1942, Serial No. 454,971

24 Claims. (Cl. 74—189.5)

My invention relates to transmissions useful in automotive vehicles and particularly to such transmissions which comprise hydrodynamic power transmitting devices such as fluid couplings or torque converters combined with gearing.

A transmission of this type ordinarily comprises, in addition to a hydrodynamic device, a set of gearing and positive engaging means, the latter being operative for completing a power train between the input and output shafts of the transmission and including the hydrodynamic device and gearing. It is characteristic of a hydrodynamic power transmitting device that the driven element of the device rotates or tends to rotate as the driving element is rotated, and the speed of and torque on the driven element is dependent on the speed of the driving element and the restraint against rotation on the driven element. These characteristics of a hydrodynamic device give rise to the problem in a transmission of this type of shifting the positive engaging means to complete the power train between the input and the output shafts without the clashing of engaging parts of the positive engaging means with the hydrodynamic device being driven by the automobile engine. This problem has been solved in some existent transmissions by the provision of a brake for stopping the driven element of the hydrodynamic device and one element of the positive engaging means when it is desired to shift the positive engaging means into engagement. This solution of the problem, however, is not always adequate in that one element of the positive engaging means may be stopped by the brake when the other element of the engaging means on shifting does not exactly mesh with the first element, and neither element of the engaging means is free to rotate so that there may be a meshing of the elements.

It is an object of my invention to provide an improved transmission of this type in which the positive engaging means may be shifted into engagement easily and without clash. More particularly, it is an object of my invention to provide improved means for breaking the power train between the hydrodynamic device and the positive engaging means to thereby free one element of the engaging means when it is desired to bring the engaging means into engagement.

More specifically, it is an object of my invention to provide, in a transmission of this type, means for rotating the driven element of the hydrodynamic device in a reverse direction when the driving element of the hydrodynamic device is rotating at idling speed and it is desired to bring the positive engaging means into engagement and to provide also means for breaking the power train between the hydrodynamic device and the positive engaging means to free the positive engaging means from the hydrodynamic device on such reverse rotation of the driven element of the device. My invention contemplates the use of gearing and a friction clutch for rotating the driven element of the hydrodynamic device in a reverse direction and the use of a roller clutch in the power train between the hydrodynamic device and positive engaging means for freeing the positive engaging means from the hydrodynamic device on the reverse rotation of the driven element of the device.

It is another object of my invention to provide a transmission of this type comprising change-speed gearing of the countershaft type with the friction clutch being so disposed that the transmission as a whole forms a compact unit. To this end my invention contemplates that the friction clutch may be disposed coaxially with respect to the countershaft.

It is another object of my invention to provide improved means for controlling a transmission of this type whereby one element of the positive engaging means is freed from the hydrodynamic power transmitting device when the accelerator of the automotive vehicle is in its idling position and the vehicle is traveling below a predetermined speed. It is still another object of my invention to provide means, for use instead of the above-mentioned transmission controlling means including the accelerator, controlled with the positive engaging means for maintaining the means provided for freeing one element of the positive engaging means inoperative when the positive engaging means is engaged.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a sectional view of a transmission embodying the principles of my invention; and Fig. 2 is a schematic diagram of means for controlling the transmission illustrated in Fig. 1.

Like characters of reference designate like parts in the several views.

The illustrated transmission comprises a hydrodynamic power transmitting unit 10 and a change speed gearing unit 11. These two units are connected between the input shaft 12 and the output shaft 13 of the transmission with the input shaft driving the hydrodynamic unit and with this unit driving the gearing unit and with the gearing unit driving the output shaft.

The hydrodynamic power transmitting unit 10 comprises a flywheel 14 supporting the usual starting ring gear 15 and being bolted to the input shaft 12. A central shaft 16 is piloted in the flywheel 14, and a hollow shaft 17 which may be termed an intermediate shaft is rotatably disposed on the shaft 16. A hollow sleeve 18 is disposed on the shaft 17 with the latter being rotatable with respect to the former, and a hollow shaft 19 formed with a gear 20 is rotatably disposed on the sleeve 18.

An impeller element 21 is bolted to the flywheel 14 through an annular member 22, and the impeller element thus rotates with the flywheel. The impeller element is fastened to a sleeve-like shaft 23 which is disposed on and is keyed to the shaft 19. A housing 24 is provided for the hydrodynamic unit 10, and a ball bearing 25 is disposed between a suitable part of the housing and the sleeve 23 to support the sleeve with respect to the housing.

A rotor element 26 is suitably fastened to a hub member 27 which is splined to the shaft 17. A stator element 28 is splined to a hub member 29 which is rotatably disposed on the sleeve 18. A roller brake 30 is provided between the hub member 29 and the sleeve 18 which allows the stator to rotate in a forward direction but prevents reverse rotation thereof with respect to the sleeve 18. The sleeve 18 is keyed at 31 to the housing 24, and the brake 30 thus prevents reverse rotation of the stator with respect to the housing.

The impeller 21 and the flywheel 14 together form a chamber for a body of oil or other suitable liquid. The impeller element 21, the rotor 26 and the stator 28 form a torque converter of the ordinary type which functions at low speed of the rotor to drive the rotor at increased torque with respect to that applied to the impeller element and with no rotation of the stator, and which functions at higher speeds of the rotor as a simple fluid coupling and with forward rotation of the stator.

The flywheel 14 is provided with an annular cavity 32 in which is slidably disposed an annular piston 33. The piston is provided with a portion forming a friction face 34, and the member 22 is formed with a friction face 35 opposite the face 34. A clutch disc 36 splined on the shaft 17 and provided with clutch facings on its periphery is disposed with its facings between the friction faces 34 and 35. The friction faces 34 and 35 and the clutch disc 36 together form a friction clutch designated as 37.

The cavity 32 is connected by passages 32' (one being shown in the drawing) with a passage 38 in the shaft 16 which is in communication with a passage 39 in the casing 24 through an appropriate opening in the shaft 17. The construction is such that fluid may be forced under pressure through the passages 39, 38 and 32' to the cavity 32 to move the piston 33 rearwardly whereby the clutch 37 is engaged. Another passage 40 is provided in the casing 24 and this passage is in communication with the spaces between the splines on the shaft 17. Fluid may thereby be forced into the fluid container formed by the impeller element 21 and the flywheel 14 for the hydraulic torque converter.

The flywheel 14 is coupled through springs 41 (one being shown in the drawing) with the shaft 16. A connecting member 42 is attached by any suitable means to the flywheel 14, and a hub member 43 is splined to the shaft 16. The member 42 is constructed with portions bearing on one end each of the springs 41 and it acts as a driving member, and the hub member 43 is formed to support the other end of each of the springs 41 and be driven thereby.

The gearing unit 11 comprises a housing or casing 44 which is suitably fixed to the casing 24 and which carries with the latter casing a ball bearing 45 for the shaft 17. The shaft 17 is provided with a gear 46 on its rear end which is in mesh with a gear 47 formed on a member 48. The member 48 is rotatably disposed in suitable aligned openings in the casings 24 and 44, and the member 48 serves to support a countershaft 49 at one end, with the countershaft being supported at its other end by the casing 44. A sleeve-like shaft 50 formed with gears 51 and 52 is rotatably disposed on the countershaft 49. A roller clutch 53 is provided between the member 48 and shaft 50, and this clutch is so constructed that member 48 may drive shaft 50 through the clutch in a direction reverse to the normal direction of rotation of the impeller 21. A lock-up clutch is also provided between these members, and this clutch comprises teeth 54 on the member 48 and teeth 55 on a member 56 adapted to mesh together, with the member 56 being slidably but non-rotatably disposed on the member 50 and being actuated by any suitable means. It will be appreciated that the lock-up clutch when engaged prevents any free wheeling action between the members 48 and 50.

The gear 51 is in mesh with a gear 57 formed on a member 58 which is rotatably disposed on the shaft 13. The shaft 13 is piloted in the shaft 16 and is supported by the casing 44 by means of a ball bearing 59. Teeth 60 are provided on the shaft 16, and these are adapted to mesh with splines provided on the inner surface of a clutch member 61 which is slidably but non-rotatably disposed on the member 58 and which may be actuated by any suitable means. The member 61 and teeth 60 provide a positive type clutch between the shaft 16 and member 58.

A clutch member 62 provided with teeth 63 and teeth 64 is slidably but non-rotatably disposed on the shaft 13. A gear 65 is rotatably disposed on the shaft 13 and is in mesh with an idler gear (not shown) which also is in mesh with the gear 52. Teeth 66 are provided on the gear 65 to mesh with the teeth 64, and teeth 67 are provided on the member 58 to mesh with the teeth 63 when the clutch member is moved one way or the other.

The member 48 is provided with a fixed clutch face 68, axially movable clutch discs 69 and an axially movable piston 70. A shaft 71, rotatably disposed in the casing 24 and on the countershaft 49 is provided with a plurality of clutch discs 72 splined thereto. The discs 72 form with the parts 68, 69, and 70 a friction clutch which may be generally designated as 73. A passage 74 is provided in the member 48 and is in communication with a passage 75 in the casing 44. The clutch 73 may be engaged by forcing fluid under pressure through the passages 75 and 74 and behind the piston 70 to move the piston forwardly. The shaft 71 is formed with a gear 76 which is in mesh with an idler gear 77 which is supported in any suitable manner from the casing 24 and is in mesh with the gear 20.

Referring now in particular to Fig. 2 of the drawing, four switches 78, 79, 80 and 81 are provided for completing a circuit including the automobile battery 82 and the winding 83 of a relay 84 for closing the relay contacts 85. Switch 78 is disposed on the dash board of the automobile where it may be easily closed. Switch 79 is closed by any suitable actuating means which functions to close the switch when the teeth 54 and 55 are brought into mesh to lock up the roller clutch 53. Switch 80 is controlled by a governor 86 which is responsive to the speed of the automobile and may be driven by the tail shaft of the automobile. I find it preferable to arrange governor 86 such that it closes switch 80 at approximately five miles an hour vehicle speed and maintains the switch closed above that speed, five miles an hour being in general a slower speed than that at which an automobile is driven by its engine with the engine idling. Switch 81 is controlled by the accelerator 87 of the automobile such that the switch is opened when the accelerator is in engine idling position, substantially as shown in the drawing, and the switch is closed when the accelerator is depressed to bring the speed of the engine above idling speed.

Relay contacts 85 serve to complete a circuit including the automobile battery 82 and winding 88 and another winding 89 and switch 90 in parallel with winding 88. The completion of the circuit through the windings 88 and 89 and the resultant flow of current therethrough serves to move an armature 91 which is provided in the windings 88 and 89 to open the switch 90. The flow of current through winding 89 is thus stopped, and the winding 88 then serves to hold the armature 91 in its switch opening position. A spring 92 is provided for moving the armature 91 to its position as shown in the drawing when the flow of current through both windings 88 and 89 has ceased.

The armature 91 is provided with a constricted portion 93 and it moves in and is supported by a hollow casing 94, and the armature and casing together form a valve. A pipe 95 is provided leading to the valve and is connected with any suitable source of fluid pressure. A pipe 96 is connected with the fluid passage 75, and in the condition of the valve as shown in the drawing, fluid under pressure passes through the pipes 95 and 96 and the passages 75 and 74 to engage the friction clutch 73. A pipe 97 is provided connected with a suitable sump for the friction clutch actuating fluid. The construction is such that when the windings 88 and 89 are energized moving the armature 91 to its position opening the contact 90, the armature 91 closes pipe 95 and provides a connection between pipe 96 and pipe 97 whereby the fluid may drain from the passages 74 and 75 to the sump.

A lever 98 pivoted at 99 to any suitable support may be provided for moving the clutch member 62. Pins 100 are provided on the armature 91, and the construction is such that when the lever 98 is moved to engage the teeth 63 and 67 or the teeth 64 and 66 with the armature 91 disposed as shown in the drawing with the pins 100 in the plane of the lever 98, the lever makes contact with one of the pins 100 and moves the armature to the left as seen in the drawing to connect the pipes 96 and 97 and close the pipe 95. With this construction, when the clutch member 62 is moved into either of its engaged positions, the friction clutch 73 is automatically disengaged, and maintained in such condition. A lever 101 is provided for turning the armature 91 about its axis, and this lever may be actuated by any suitable means. By means of the lever 101, the armature 91 may be rotated about its axis to move the pins 100 out of the plane of the lever 98, whereby the lever does not make contact with the pins when the hub member 62 is moved to one side or the other to make engagement. In the normal operation of the automobile, the armature is turned from its position as shown in the drawing to such axial position with the pins out of the plane of the lever 98, as will be hereinafter described.

The illustrated transmission provides neutral, three forward speed ratios and a drive in reverse. With the clutch members 61 and 62 disengaged, the transmission is in neutral. To secure the lowest forward speed ratio, the clutch member 62 is shifted forwardly to bring the teeth 63 and 67 into mesh, and the drive is then from the input shaft 12 through the flywheel 14, the impeller element 21 of the torque converter, the rotor 26, the hub member 27, the shaft 17, the gears 46 and 47, the member 48, the roller clutch 53, the member 50, the gears 51 and 57, the teeth 67 and 63, and the clutch member 62 to the output shaft 13. Intermediate speed ratio may be obtained by engaging the clutch 37 by forcing fluid under pressure through the passages 39, 38 and 32' to move the piston 33 rearwardly in the cavity 32. The power path in this speed ratio is the same as in low speed ratio except that the flywheel 14 and shaft 17 are connected through the clutch 37 instead of the torque converter, and the speed of the flywheel and shaft 17 in this speed ratio are substantially the same. High forward speed ratio may be obtained by engaging the clutch member 61 and the teeth 60, leaving the teeth 63 and 67 in mesh. In this speed ratio, the drive through the transmission is from the input shaft 12, through the flywheel 14, the member 42, the springs 41, the hub 43, the shaft 16, the teeth 60, the clutch member 61, the member 58, the teeth 67 and 63, and the clutch member 62 to the output shaft 13. In high speed ratio, the roller clutch 53 overruns. Reverse drive may be established by engaging the teeth 64 and 66 by moving the clutch member 62 rearwardly with the clutch member 61 and teeth 60 out of engagement and with the clutch 37 disengaged. In reverse drive, the power path through the transmission is the same as in low speed forward drive except that the drive rather than being through the gears 51 and 57, the teeth 67 and 63, and the clutch member 62, is through the gears 52 and 65 and the idler gear (not shown) in mesh with these two gears, and through the teeth 66 and 64 and the clutch member 62 to the output shaft 13.

It will be appreciated that when the transmission is in neutral, prior to shifting into low forward speed ratio or reverse drive, and with the automobile engine running, the rotor 26 of the torque converter would be driven by the impeller element 21, and the gears 57 and 65 and the associated teeth 67 and 66 would be moving if there were provided no means for preventing this. Under such conditions it would be, of course, practically impossible to shift the clutch member 62 to mesh the teeth 63 and 67 or the teeth 64 and 66 without clashing and perhaps breaking the teeth. The illustrated transmission control means which I provide operates to free the member 50 and gears 51 and 52 from the member 48 when the automobile accelerator is in engine idling position and the automobile is standing at rest whereby the teeth 63 and 67 or the teeth 64 and 66 may be meshed without clash.

With the accelerator 87 in its engine idling position whereby the switch 81 is open and with the governor 86 stationary or rotating with the automobile at a speed less than five miles per hour whereby the switch 80 is open, and with the switches 78 and 79 open, all as shown in Fig. 2, there is no current through the winding 83, the relay contacts 85 are open and no current is supplied to the windings 88 and 89. Under these conditions the armature 91 is in its position as shown in Fig. 2 and the pipes 95 and 96 are connected to provide fluid under pressure through the passages 75 and 74 to engage the clutch 73 and maintain it engaged. Due to the idler gear 77 in mesh with the gears 20 and 76 and due to the connection between the shaft 19 carrying the gear 20 and the impeller element 21, the shaft 71 is at all times rotated in a direction reverse to that which the gear 47 and member 48 tend to rotate under the drive of the rotor 26. When the clutch 73 is engaged with the motor idling, the member 48 and the gear 47 are rotated in a direction reverse to their normal direction of rotation, and the rotor 26 is also rotated in a reverse direction due to the gear 46 and the shaft 17 connecting the gear 47 and rotor. When the automobile engine is idling, and the impeller element 21 is moving at idling speed, little torque is applied to the rotor 26 by reason of the rotation of the impeller element, and the clutch 73, therefore, need only transmit a small amount of power to rotate the rotor 26 in a reverse direction. When the member 48 moves in a direction reverse to its normal direction of rotation, the roller clutch 53 overruns and frees the member 50 from the member 48. Thus the member 50 and thereby either of the gears 57 and 65 may be held stationary or rotated slightly in either direction in engaging the teeth 63 and 67 or the teeth 64 and 66, and the teeth may be brought easily into mesh.

When the accelerator 87 is moved from its engine idling position to feed more fuel to the engine, after either the teeth 63 and 67 or the teeth 64 and 66 have been meshed, the switch 81 is closed whereby relay contacts 85 are closed. The windings 88 and 89 are thereby energized, and the armature 91 is moved to the left, as seen in the drawing, to open switch 90. The armature is maintained in such position due to current through the winding 88 when the switch 90 is open. The pipe 95 is closed by the movement of the armature, and fluid drains from the clutch 73 through the passages 74 and 75 and pipes 96 and 97 to disengage the clutch 73. The rotor 26 may thereafter rotate freely in its normal direction of rotation to drive the members 48 and 50 in their normal direction of rotation.

The governor 86 operates to maintain the switch 80 closed when the automobile is moving above a slow speed whereby the relay contacts 85 are maintained in closed relation and the winding 88 is energized. The governor 86 thus serves to maintain the clutch 73 disengaged, even though the accelerator is released to engine idling position, when the automobile is moving under power from the engine. The dash switch 78 is provided in order that the engine and transmission may be tested with the automobile standing at rest without engaging the clutch 73. The switch 79, actuated by the lock up clutch 56, serves to maintain the clutch 73 disengaged when the roller clutch 53 is locked up by engagement of the teeth 54 and 55 whereby the member 50 could not move freely with respect to the member 48.

When the automobile is moving and it is desired to bring the transmission into neutral, the accelerator is released to open the switch 81 and the automobile is braked to bring it below the critical speed of the governor to open the switch 80, and the contacts 85 open and the armature moves to the right, as seen in the drawing, to engage the clutch 73. Member 48 and gears 57 and 65 are thus freed, and the teeth 63 and 67 or the teeth 64 and 66 may be easily disengaged.

Under ordinary operating conditions of the automobile, the armature 91 is maintained in a position axially rotated with respect to its position shown in the drawing such that the pins 100 are out of the plane of the lever 98. With the automobile moving at ordinary speeds under power of the engine, the governor 86 and the switch 80 operate to maintain the clutch 73 disengaged, and the lever 98 and pins 100 are not needed to perform this function. However, if the electrical system should fail, as, for example, if the battery 82 should become discharged, then the armature 91 may be rotated to its position as shown in Fig. 2, and the lever 98 and pins 100 will cooperate to maintain the armature in its position connecting the pipes 96 and 97 to maintain the clutch 73 disengaged when the clutch member 62 is in either of its engaged positions.

My improved transmission and control therefor is advantageously constructed such that the positive engaging clutch in the transmission may be engaged for low forward speed ratio or reverse drive without clash and may be easily disengaged when desired, regardless of the fact that the rotor of the torque converter is under torque at idling speeds of the engine. The friction clutch for freeing an element of the positive type clutch under idling conditions of the automobile engine is disposed coaxially with respect to the countershaft of the transmission, and the transmission construction is thus made quite compact. The control system for the transmission permits the friction clutch to be engaged to free an element of the positive type clutch only when the accelerator is in idling position and the automobile is moving below a predetermined speed, and there is thus no unnecessary wear of the friction clutch.

I wish it to be understood that my invention is not to be limited to the specific construction shown and described, except so far as certain of the claims may be so limited, as it will be apparent to those skilled in the art that changes may be made without departing from the principles of my invention.

I claim:

1. In a transmission; the combination of an input shaft; an output shaft; a power train operatively connecting said shafts; a positive type clutch for completing said power train; a hydrodynamic power transmitting device in said power train between said clutch and said input shaft and capable of slipping; said hydrodynamic device producing torque when driven such that the engagement of the positive clutch is rendered difficult when the input shaft is being driven; and means for rendering facile the engagement of said positive clutch including gear means driven from said input shaft and a friction clutch for driving from said input shaft the driven element of said hydrodynamic device in a reverse direction, and a roller clutch in said power train between said positive type clutch and said hydrodynamic device for freeing one element of the positive type clutch with respect to the driven element of the hydrodynamic device on such reverse rotation of the driven element of the hydrodynamic device.

2. In a transmission, the combination of an input shaft, an output shaft, a power train operatively connecting said shafts, positive engaging means for completing said power train, coupling means in said power train between said engaging means and said input shaft producing torque when driven and capable of slipping, a pair of meshed gears in said power train, one of said gears being driven by said coupling means and the other being disposed on a countershaft, means including a friction clutch in axial alignment with said last named gear for rotating the gear in a direction reverse to its normal direction of rotation, and means rendered operative by the reverse rotation of said last-named gear for breaking the power train between said positive engaging means and said last-named gear for freeing one of the elements of said engaging means from said last-named gear whereby the engaging means may be brought into engagement while said input shaft is being driven.

3. In a transmission, the combination of an input shaft, an output shaft, a power train operatively connecting said shafts, positive engaging means for completing said power train, coupling means in said power train between said engaging means and said input shaft producing torque when driven and capable of slipping, a pair of meshed gears in said power train, one of said gears being driven by said coupling means and the other being disposed on a countershaft, means including gearing driven by said input shaft and a friction clutch in axial alignment with said countershaft for driving said gear on the countershaft in a direction reverse to its normal direction of rotation, and a roller clutch in said power train between said gear on the countershaft and said positive engaging means for freeing one of the elements of said engaging means on such reverse rotation of said gear on the countershaft whereby the engaging means may be brought into engagement while said input shaft is being driven.

4. In a transmission, the combination of an input shaft, an output shaft, a power train operatively connecting said shafts, a positive type clutch for completing said power train, a hydrodynamic power transmitting device in said power train between said clutch and said input shaft producing torque when driven and capable of slipping, a pair of meshed gears in said power train, one of said gears being driven by said hydrodynamic device and the other being disposed on a countershaft, means including gearing driven by said input shaft and a friction clutch in axial alignment with said countershaft for driving said gear on the counter-shaft in a direction reverse to its normal direction of rotation, and a roller clutch in said power train between said gear on the countershaft and said positive type clutch for freeing one of the elements of the positive type clutch on such reverse rotation of said gear on the countershaft whereby the positive type clutch may be brought into engagement while said input shaft is being driven.

5. In a transmission for an automotive vehicle; the combination of an input shaft; an output shaft; a power train comprising a plurality of members and operatively connecting said shafts; positive engaging means for completing said power train; coupling means in said power train capable of slipping; a throttle; a throttle control, said coupling means producing torque when driven such that the engagement of the positive engaging means is rendered difficult when the input shaft is being driven; and means for rendering facile the engagement of said engaging means and including means for freeing one of the elements of said engaging means when one of said members in said power train and between said coupling means and engaging means is rotated in a direction reverse to its normal direction of rotation, means for rotating said member in such reverse direction, and a governor responsive to the speed of the vehicle, said last named means being under the control of said throttle control and said governor to free an element of the engaging means when the throttle control is in engine idling position and the speed of the vehicle is below a certain value.

6. In a transmission for an automotive vehicle, the combination of an input shaft, an output shaft, a power train operatively connecting said shafts, a positive type clutch for completing said power train, a hydrodynamic power transmitting device in said power train between said clutch and said input shaft producing torque when driven and capable of slipping, a throttle, a throttle control, a governor responsive to the speed of the vehicle, a roller clutch in said power train for freeing one of the elements of said positive type clutch when the driven element of said hydrodynamic device is rotated in a reverse direction whereby the positive clutch may be brought into engagement while said input shaft is being driven, and means for rotating the driven element of said hydrodynamic coupling in a reverse direction, said last named means being under the control of said throttle control and said governor to free an element of the positive clutch when the throttle control is in engine idling position and the speed of the vehicle is below a certain value.

7. In a transmission for an automotive vehicle, the combination of an input shaft, an output shaft, a power train operatively connecting said shafts, a positive type clutch for completing said power train, a hydrodynamic power transmitting device in said power train between said clutch and said input shaft producing torque when driven and capable of slipping, a roller clutch in said power train for freeing one of the elements of said positive clutch when the driven element of said hydrodynamic device is rotated in a reverse direction whereby the positive clutch may be brought into engagement while said input shaft is being driven, means including gearing driven by said input shaft and a friction clutch for rotating the driven element of said hydrodynamic device in a reverse direction when the friction clutch is engaged, a throttle, a throttle control, and a governor responsive to the speed of the vehicle, said friction clutch being under the control of said throttle control and said governor and being engaged when the throttle control is in engine idling position and the speed of the vehicle is below a certain value.

8. In a transmission, the combination of an input shaft, an output shaft, a power train operatively connecting said shafts, a positive type clutch for completing said power train, a hydrodynamic power transmitting device in said power train between said clutch and said input shaft producing torque when driven and capable of slipping, a roller clutch in said power train for freeing one of the elements of said positive clutch on the driven element of said hydrodynamic device being rotated in a reverse direction whereby the positive clutch may be brought into engagement while said input shaft is being driven, means including gearing driven by said input shaft and a friction clutch for rotating the driven element of the hydrodynamic device in a reverse direction when the friction clutch is engaged, a lever for moving said positive clutch into engagement, and means under the control of said lever for maintaining the friction clutch disengaged when the positive type clutch is engaged.

9. In a transmission, the combination of an input shaft, an output shaft, a hydrodynamic power transmitting device driven by said input shaft, a one-way clutch and a positive type clutch for operatively connecting said hydro-dynamic device and said output shaft, a governor responsive to the speed of one of said shafts, and means for driving the driven element of said hydrodynamic device in a reverse direction, said governor being adapted to control said driving means for maintaining the means inoperative when the speed of said last named shaft is above a certain value.

10. In a transmission, the combination of an input shaft, an output shaft, a hydrodynamic power transmitting device driven by said input shaft, a one-way clutch and a positive type clutch connected serially for providing a power train between said hydrodynamic device and said output shaft, said one-way clutch being positioned between the driven element of said hydrodynamic device and said positive type clutch, a lever for moving said positive clutch into engagement, and means for driving the driven element of said hydrodynamic device in a reverse direction for thereby breaking the power train between the driven element of said hydrodynamic device and the positive type clutch at the point where the one-way clutch is located and for facilitating the engagement of said positive type clutch, said lever being adapted to control said driving means for maintaining the means inoperative when the positive clutch is engaged.

11. In a transmission for an automotive vehicle, the combination of an input shaft, an output shaft, a power train operatively connecting said shafts, positive engaging means for completing said power train, a hydrodynamic power transmitting device in said power train producing torque when driven, a throttle, a throttle control, a governor responsive to the speed of the vehicle, means for rotating one of the members in said power train between said coupling means and said engaging means in a direction reverse to its normal direction of rotation, and means rendered operative by such reverse rotation of said member for freeing one of the elements of said engaging means with respect to said member whereby the engaging means may be brought into engagement while said input shaft is being driven, said second named means being under the control of said throttle control and said governor to free an element of the engaging means when the throttle control is in engine idling position and the speed of the vehicle is below a certain value.

12. In a transmission, the combination of an input shaft, an output shaft, a positive clutch and a one-way clutch normally connected in series for conjointly providing a power train between said shafts, means continuously driven from said input shaft in a reverse direction from the normal direction of rotation of one element of said one-way clutch, and means for establishing a driving connection between said continuously driven means and said one element of said one-way clutch for driving said one element of the one-way clutch in a direction to release the one-way clutch, whereby the positive clutch may be engaged with substantially no torque on the engaging elements of the positive clutch.

13. In a transmission, the combination of an input shaft, an output shaft, a positive clutch and a one-way clutch connected in series for providing a power train between said shafts, and means for driving one element of the one-way clutch from said input shaft in a direction to release the one-way clutch whereby the positive clutch may be engaged with substantially no torque on the engaging elements of the positive clutch, said last named means including gearing and a selectively controlled coupling means for providing a power train between said input shaft and said one element of the one-way clutch.

14. In a transmission; the combination of an input shaft; an output shaft; a power train comprising a plurality of members and adapted to operatively connect said shafts; positive engaging means including elements for completing said power train; coupling means in said power train between said input and output shafts capable of slipping, said coupling means producing torque when driven such that the engagement of the elements of said positive engaging means is normally rendered difficult when the input shaft is being driven; and means driven from said input shaft for rendering facile the engagement of the elements of said positive engaging means and including means actuatable for continuously rotating one of said members in said power train between said coupling means and said positive engaging means in a direction reverse to its normal direction of rotation, and means rendered operative by such continuous reverse rotation of said member for breaking the power train between said positive engaging means and said member for freeing one of the elements of said engaging means with respect to said member.

15. In a transmission, the combination of input and output shafts, an intermediate shaft, positive engaging means including elements for operatively connecting said intermediate shaft and one of said first-named shafts, coupling means for operatively connecting said intermediate shaft and the other of said first-named shafts and producing torque when driven and permitting rotation of the intermediate shaft in a direction reverse to its normal direction of rotation, mean actuatable for continuously rotating said intermediate shaft in such reverse direction, and means rendered operative by such continuous reverse rotation of said intermediate shaft for breaking the power train between the positive engaging means and said intermediate shaft for freeing one of the elements of said positive engaging means with respect to said intermediate shaft, whereby the engaging means may be brought into engagement while said input shaft is being driven.

16. In a transmission, the combination of an input shaft, an output shaft, a power train adapted to operatively connect said shafts, positive engaging means including elements for completing said power train, a hydrodynamic power transmitting device in said power train between said engaging means and said input shaft producing torque when driven and capable of slipping, said hydrodynamic device including a driving element and a driven element, means driven by the driving element of said hydrodynamic device for selectively driving, from said input shaft, the driven element of said hydrodynamic device continuously in a reverse direction, and means rendered operative by such continuous reverse rotation of the driven element of said hydrodynamic device for breaking the power train between the positive engaging means and the driven element of said hydrodynamic device for freeing one of the elements of said engaging means with respect to the driven element of the hydrodynamic device, whereby the elements of said engaging means may be brought into engagement while said input shaft is being driven.

17. In a transmission, the combination of an input shaft, an output shaft, a power train adapted to operatively connect said shafts, positive engaging means including elements for completing said power train, a hydrodynamic power transmitting device in said power train between said engaging means and said input shaft producing torque when driven and capable of slipping, said hydrodynamic device including a driving element and a driven element, means driven from said input shaft and including a friction clutch engageable for driving, from said input shaft, the driven element of said hydrodynamic device continuously in a reverse direction, and means rendered operative by such continuous reverse rotation of the driven element of said hydrodynamic device for breaking the power train between the positive engaging means and the driven element of said hydrodynamic device for freeing one of the elements of said engaging means with respect to the driven element of the hydrodynamic device, whereby the elements of said engaging means may be brought into engagement while said input shaft is being driven.

18. In a transmission, the combination of an input shaft, an output shaft, a power train adapted to operatively connect said shafts, a positive type clutch including engaging elements for completing said power train, a hydrodynamic power transmitting device in said power train between said positive type clutch and said input shaft producing torque when driven and capable of slipping, said hydrodynamic device including a driving element and a driven element, means driven from the driving element of said hydrodynamic device engageable for continuously rotating the driven element of said hydrodynamic device in a reverse direction, and a one-way roller clutch positioned in said power train between said positive type clutch and said driven element of said hydrodynamic device and rendered operative by the continuous reverse rotation of said driven element of said hydrodynamic device for breaking the power train between said positive engaging elements and the driven element of said hydrodynamic device for freeing one element of the positive type clutch with respect to the driven element of the hydrodynamic device, whereby the engaging elements of said positive type clutch may be brought into engagement while said input shaft is being driven.

19. In a transmission, the combination of an input shaft, an output shaft, a power train adapted to operatively connect said shafts, positive engaging means including elements for completing said power train, coupling means in said power train between said positive engaging means and said input shaft producing torque when driven and capable of slipping, a member in said power train normally driven in one direction by said coupling means and disposed on a countershaft, means including a clutch engageable for driving, from said input shaft, said countershaft member continuously in a direction reverse to its normal direction of rotation, and means rendered operative by the continuous reverse rotation of said countershaft member for breaking the power train between the positive engaging means and the countershaft member for freeing one of the elements of said positive engaging means with respect to said countershaft member whereby the elements of said positive engaging means may be brought into engagement while said input shaft is being driven.

20. In a transmission, the combination of an input shaft, an output shaft, a hydrodynamic power transmitting device driven by said input shaft, said hydrodynamic device including a driving element and a driven element, means driven from the driving element of said hydrodynamic device for selectively driving the driven element of said hydrodynamic device continuously in a reverse direction, a one-way clutch and a positive type clutch connected in series for operatively connecting said hydrodynamic device and said output shaft, said one-way clutch being positioned between the driven element of said hydrodynamic device and said positive type clutch.

21. In a transmission, the combination of an input shaft, an output shaft, a hydrodynamic power transmitting device driven by said input shaft, said hydrodynamic device including a driving element and a driven element, gearing driven by said input shaft and a friction clutch driven from said input shaft adapted when engaged to drive the driven element of said hydrodynamic device continuously in a reverse direction, a one-way clutch and a positive type clutch connected in series for operatively connecting said hydrodynamic device and said output shaft, said one-way clutch being positioned between the driven element of said hydrodynamic device and said positive type clutch.

22. In a transmission, the combination of an input shaft, an output shaft, a power train comprising a plurality of members and adapted to operatively connect said shafts, a positive type clutch for completing said power train, coupling means in said power train producing torque when driven and capable of slipping, means for rotating one of said members in said power train and between said coupling means and said positive type clutch in a direction reverse to its normal direction of rotation, means rendered operative by such reverse rotation of said member for breaking the power train between said positive type clutch and said member for freeing one of the elements of said positive type clutch from said member whereby the clutch may be brought into engagement while said input shaft is being driven, and means controlling said member-rotating means and said clutch for maintaining the member-rotating means inoperative when the clutch is engaged.

23. In a transmission, the combination of an input shaft, an output shaft, a hydrodynamic power transmitting device driven by said input shaft, a throttle, a throttle control, means for continuously driving the driven element of said hydrodynamic device in a reverse direction, said throttle control being adapted to control said driving means for maintaining the means inoperative when the throttle is opened beyond engine idling position, a one-way clutch and a positive type clutch connected serially for providing a power train between said hydrodynamic device and said output shaft, said one-way clutch being positioned between the driven element of said hydrodynamic device and said positive type clutch.

24. In a transmission for an automotive vehicle, the combination of an input shaft, an output shaft, a power train adapted to operatively connect said shafts, positive engaging means for completing said power train, a hydrodynamic power transmitting device in said power train producing torque when driven, a throttle, a throttle control, means for rotating in a direction reverse to its normal direction of rotation one of the members in said power train positioned between said hydrodynamic device and said engaging means, and means rendered operative by such reverse rotation of said member for breaking the power train between said positive engaging means and said member for freeing one of the elements of said engaging means with respect to said member, said second named means being under the control of said throttle control and being actuated to rotate said member continuously in the said reverse direction when the throttle is in engine idling position.

HAROLD E. CARNAGUA.

REFERENCES CITED

The following references are of record in the file of this patent:

UNITED STATES PATENTS

| Number | Name | Date |
|---|---|---|
| 1,978,172 | Sinclair | Oct. 23, 1934 |
| 2,076,362 | Boldt et al. | Apr. 6, 1937 |
| 2,084,219 | Salerni | June 15, 1937 |
| 2,102,755 | Sinclair | Dec. 21, 1937 |
| 2,104,605 | Boldt | Jan. 4, 1938 |
| 2,104,608 | Cox et al. | Jan. 4, 1938 |
| 2,115,097 | Durham | Apr. 26, 1938 |
| 2,169,216 | Bloxsom | Aug. 15, 1939 |
| 2,243,482 | Meyer | May 27, 1941 |
| 2,247,714 | Peterson et al. | July 1, 1941 |
| 2,252,042 | Sinclair | Aug. 12, 1941 |
| 2,257,674 | Dunn | Sept. 30, 1941 |
| 2,276,862 | Peterson et al. | Mar. 17, 1942 |
| 2,300,036 | Peterson et al. | Oct. 27, 1942 |
| 2,323,070 | Meyer | June 29, 1943 |
| 2,353,137 | Banker | July 11, 1944 |

FOREIGN PATENTS

| Number | Country | Date |
|---|---|---|
| 461,947 | Great Britain | Feb. 26, 1937 |